UNITED STATES PATENT OFFICE.

SALAMON SZÉKELY AND EMERICH KOVÁCS, OF BUDAPEST, AUSTRIA-HUNGARY.

PROCESS OF MANUFACTURING MILK PREPARATIONS.

No. 811,971. Specification of Letters Patent. Patented Feb. 6, 1906.

Application filed October 13, 1902. Serial No. 127,181.

*To all whom it may concern:*

Be it known that we, SALAMON SZÉKELY and EMERICH KOVÁCS, chemists, of 43 Terézkörut, Budapest, in the Empire of Austria-Hungary, have invented new and useful Improvements in Processes for the Manufacture of Milk Preparations, of which the following is a specification.

Owing to the large proportion of a compound of casein and lime and phosphate of lime contained in cow's milk, it cannot be used for feeding babies in place of human milk. In order to obtain a milk containing in a state of suspension the same proportion of those substances contained in human milk, cows' milk has been diluted with water; but this reduces the nourishing properties of all the nourishing substances. On the other hand, casein has been precipitated with rennet and the whey thus obtained mixed with a suitable proportion of cream. The precipitation of casein by means of rennet implies, however, subsequent heating of the whey or of the milk at a fairly high temperature, the consequence being that these substances undergo substantial modification and so lose their natural character—for instance, albuminous substances coagulate, enzymes are destroyed, &c. It is equally inadvisable to precipitate casein by means of most chemical reagents—such as most acids, salts, alcohol—as they cannot be subsequently removed from the whey, and they bring about important chemical modifications.

We have discovered that carbonic acid at a high pressure has under certain circumstances the property of precipitating casein in the form in which it is met with in milk—viz., as a compound of casein and lime—without bringing about any chemical modification of the milk, as far as we have been able to discover. This precipitating action is probably due to the property of carbonic acid of absorbing water or to the fact that the casein-lime compound is not soluble in liquid strongly saturated with carbonic acid. The casein precipitated carries with it the substances in the state of suspension in the milk, such as fat and phosphate of lime, so that they are also precipitated. It must be pointed out here that it is already known to saturate milk with carbonic acid at a normal pressure, or at one to four atmospheres pressure; but this does not produce a precipitation of the casein.

According to this invention, milk heated to the temperature of the body, or nearly so, or more is thoroughly mixed with large quantities of carbonic acid, the casein thus being precipitated. The whey filtered out from the casein precipitation is then freed from carbonic acid by centrifugal action, ventilation, or by means of a suction-pump. In order to obtain milk containing little or no casein, the process is, therefore, as follows: Fresh milk, skimmed milk, buttermilk, or cream is heated to a temperature as high as possible (approximately 60° centigrade) below the coagulation-point of albumen and placed in a hermetically-closed vessel with thick walls, into which is admitted carbonic acid at a high pressure, and is brought into a thorough contact with the said carbonic acid by shaking. The pressure vessel or "decaseinator" is filled up to nine-tenths of its capacity with warm milk, and carbonic acid is admitted into the milk from a cylinder containing liquid carbonic acid until the pressure-gage of the decaseinator shows about thirty atmospheres pressure, whereupon after the mixing of the milk with the carbonic acid casein is instantaneously precipitated. It is impossible to state exactly with what pressure carbonic acid should be introduced in order to precipitate casein, as this depends on the method of working and on the temperature of the milk and also on the proportion between the quantity of milk and the air-space above it. Carbonic acid is therefore admitted into the milk until a sample taken out shows that the milk has been decomposed. On opening a valve first whey mixed with a few flakes of casein will be discharged from the decaseinator and then pure whey, the greater portion of the carbonic acid escaping into the atmosphere. The greater portion of the casein will remain in the decaseinator. The whey thus obtained is sterile, or nearly so. After having been freed from carbonic acid by ventilation, centrifugal action, or pumping the whey regains the property of dissolving casein separated from it. If, therefore, this whey is mixed with finely-ground casein in a luke-warm state, the casein will be dissolved therein and the original milk thus reproduced, or by dissolving a portion of the casein milk with any desired proportion of casein can be produced. With the casein are dissolved or brought into suspension the other ingredients which were formerly in the state of suspension, such as fat and phosphate of lime.

If it is desired to produce milk similar to human milk, a corresponding quantity of the precipitated and suspended ingredients, as fat, casein, and phosphate of lime obtained from unskimmed milk or cream, with a suitable proportion of fat, can be dissolved in the whey; but the desired proportion of casein and fat can be replaced by mixing the whey with unskimmed milk or cream in suitable proportions, as in this way the desired quantity of suspension ingredients—such as casein, fat, and phosphate of lime—will be again added to the whey.

It is possible by means of this invention to obtain a sterile or nearly sterile product resembling human milk from the whey made in the manner described without having to sterilize or pasteurize the prepared milk.

The whey made according to the described process is distinguished especially by the great advantage that it is sterile or nearly sterile, since the greater part of the bacteria of the milk are collected and are carried away with the ingredients which are separated out of the milk. It is obvious, therefore, that by previously sterilizing or pasteurizing the casein and fat or full milk or cream which are to be added to the whey to make human milk such milk will be sterile or nearly sterile without subjecting it to any sterilizing or pasteurizing process after it is compounded. Thus those ingredients of the compounded milk which originate in the whey are contained in the product in unchanged form, and the taste and character of natural milk is retained in the proportion which the quantity of whey bears to the sterilized or pasteurized casein and fat or milk or cream.

Though we have described with great particularity of detail a specific example of the process, yet it is not to be understood that the invention is limited to the specific embodiment described. Various modifications may be made by those skilled in the art without departure from the invention.

What we claim is—

1. In the manufacture of milk preparations the subprocess of making an easily-digestible whey which is approximately germ-free from cows' milk, consisting in heating the milk to a temperature as high as possible below the coagulation-point of albumen, introducing carbonic acid at a high pressure substantially in excess of four atmospheres and agitating the milk, whereby the ingredients in suspension are precipitated, and drawing off the clear whey free from the precipitate.

2. In the manufacture of milk preparations, the process of making an easily-digestible product resembling human milk which is approximately germ-free from cows' milk, which consists in heating the same to a temperature as high as possible below the coagulation-point of albumen, introducing carbonic acid under high pressure substantially in excess of four atmospheres and agitating the milk, whereby the ingredients in suspension are precipitated, removing the carbonic acid, separating the clear whey from the precipitate, sterilizing the precipitate, and adding to the whey a sufficient percentage of the precipitate to supply the milk ingredients necessary to form the desired product.

3. In the manufacture of milk preparations the process of making an easily-digestible product resembling human milk which is approximately germ-free from cows' milk, which consists in heating the same to a temperature as high as possible below the coagulation-point of albumen, introducing carbonic acid under high pressure substantially in excess of four atmospheres and agitating the milk, whereby the ingredients in suspension are precipitated, removing the carbonic acid, separating the clear whey from the precipitate, and adding to the whey a sufficient percentage of pasteurized or sterilized milk ingredients to form the desired product.

In testimony whereof we affix our signatures in presence of two witnesses.

SALAMON SZÉKELY.
EMERICH KOVÁCS.

Witnesses:
 JOSEF NICKMANN,
 ARTHUR BARUCH.